US010302398B2

(12) United States Patent
Burke et al.

(10) Patent No.: US 10,302,398 B2
(45) Date of Patent: May 28, 2019

(54) VEHICLE BASED INDEPENDENT RANGE SYSTEM (VBIRS)

(71) Applicant: Space Information Laboratories, LLC, Santa Maria, CA (US)

(72) Inventors: Edmund David Burke, Santa Maria, CA (US); Martin Stewart Waldman, Santa Maria, CA (US)

(73) Assignee: SPACE INFORMATION LaBoratories, LLC, Santa Maria, CA (US)

( * ) Notice: Subject to any disclaimer, the term of this patent is extended or adjusted under 35 U.S.C. 154(b) by 0 days.

(21) Appl. No.: 15/589,440

(22) Filed: May 8, 2017

(65) Prior Publication Data

US 2017/0328678 A1 Nov. 16, 2017

Related U.S. Application Data

(60) Provisional application No. 62/334,113, filed on May 10, 2016.

(51) Int. Cl.
*F41G 7/00* (2006.01)
*F41G 3/04* (2006.01)
(Continued)

(52) U.S. Cl.
CPC ............. *F41G 7/006* (2013.01); *B64G 1/002* (2013.01); *B64G 1/1014* (2013.01); *F41G 3/04* (2013.01);
(Continued)

(58) Field of Classification Search
CPC . F41G 7/006; F41G 7/36; F41G 7/346; F41G 7/007; F41G 7/008; F41G 7/224;
(Continued)

(56) References Cited

U.S. PATENT DOCUMENTS 5,511,218 A * 4/1996 Castelaz .................. F41G 3/04
5,739,787 A 4/1998 Burke
(Continued)

OTHER PUBLICATIONS

Cloud Constellation Innovative Space-Based Communications Platform Mar. 2017 Article by Cloud Constellation Corporation, 10850 Wilshire Blvd. Los Angeles, CA.
(Continued)

*Primary Examiner* — Bernarr E Gregory

(57) ABSTRACT

A Vehicle Based Independent Range System (VBIRS) (10) comprised of individual stacked chambered modules that function as a single integrated system that provides a self-contained space based range capability, and is comprised of a power module (12), an artificial intelligence/autonomous engagement/flight termination system module (20), a satellite data modem module system (30) and a navigation, communications and control module system (40), all of which interface with a VBIRS test and checkout system (52) and a weather data system (116). The artificial intelligence/autonomous engagement/flight termination system module (20) is comprised of an inherent artificial intelligence capability that envelopes and interchanges data with an autonomous engagement controller (22) that contains all missile/rocket autonomous cooperative engagement, destruct decision software and range safety algorithm parameters required for optimum mission planning. VBIRS employed aboard an aircraft or between any combination of launching systems allows that aircraft to launch a missile/rocket from any location on earth, whether the missile/rocket is singularly launched by itself or as a larger group of missiles/rockets launched in a salvo arrangement, while providing collaborative real-time targeting to occur directly between missiles/rockets in conjunction with other missile/rocket launch platforms or stand-alone mission control centers.

4 Claims, 5 Drawing Sheets

Figure 1:
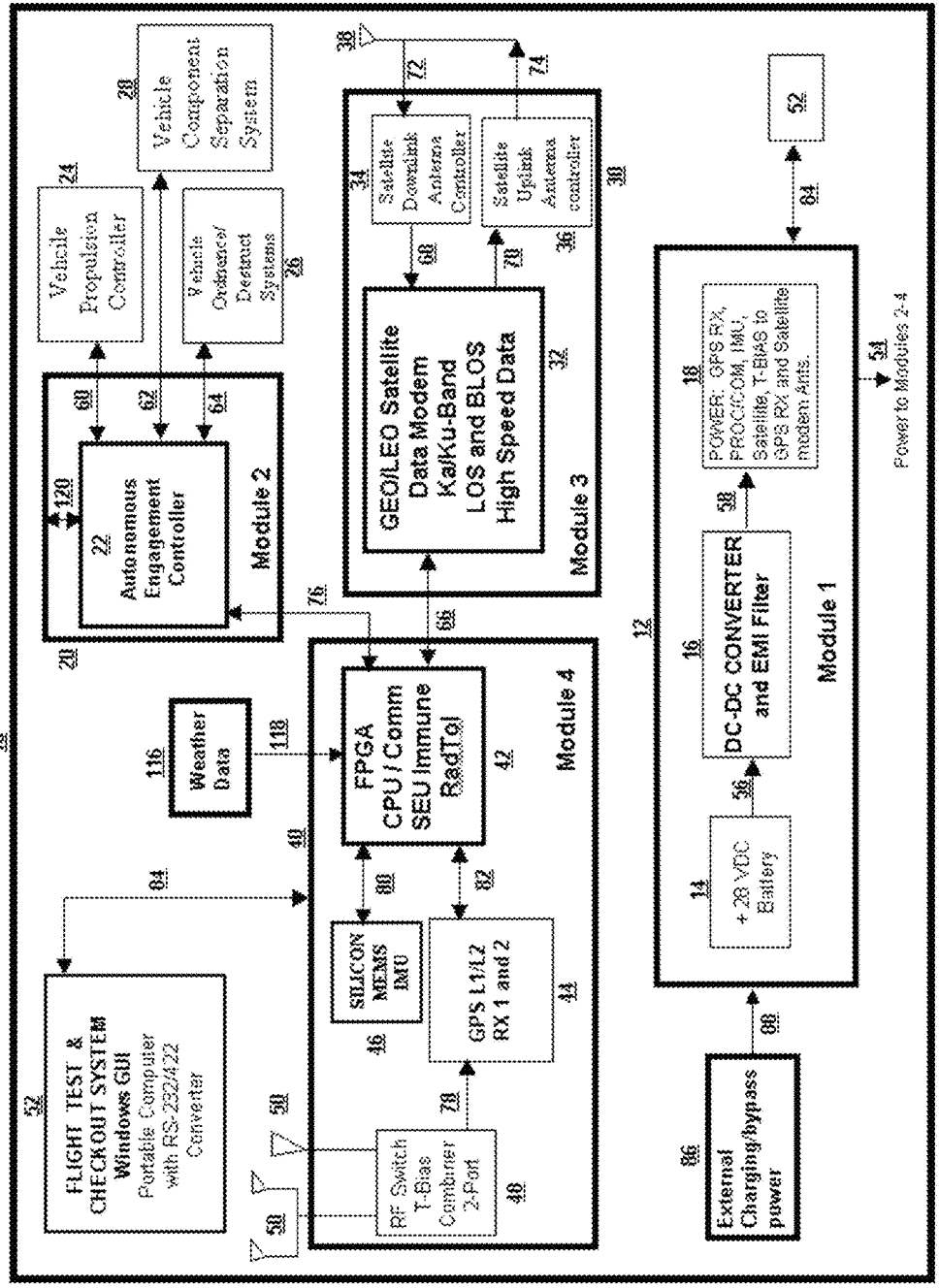

(51) Int. Cl.
*F41G 9/00* (2006.01)
*F41G 7/36* (2006.01)
*F41G 7/34* (2006.01)
*G01S 5/00* (2006.01)
*B64G 1/00* (2006.01)
*B64G 1/10* (2006.01)
*F41G 7/22* (2006.01)
*B64G 1/24* (2006.01)

(52) U.S. Cl.
CPC ............ *F41G 7/007* (2013.01); *F41G 7/008* (2013.01); *F41G 7/224* (2013.01); *F41G 7/346* (2013.01); *F41G 7/36* (2013.01); *F41G 9/00* (2013.01); *G01S 5/0036* (2013.01); *B64G 2001/247* (2013.01)

(58) Field of Classification Search
CPC ... F41G 9/00; F41G 3/04; F41G 7/001; F41G 7/30; G01S 5/0036; B64G 1/002; B64G 1/1014; B64G 2001/247; F41H 11/02
See application file for complete search history.

(56) References Cited

U.S. PATENT DOCUMENTS

| | | | |
|---|---|---|---|
| 5,866,837 A * | 2/1999 | Biven et al. | ............ F41G 7/001 |
| 6,167,263 A | 12/2000 | Campbell | |
| 6,196,496 B1 * | 3/2001 | Moskovitz et al. | ...... F41G 3/04 |
| 7,394,047 B1 * | 7/2008 | Pedersen | .................. F41G 7/30 |
| 7,494,089 B2 * | 2/2009 | Williams et al. | ......... F41G 3/04 |
| 7,494,090 B2 * | 2/2009 | Leal et al. | ................. F41G 3/04 |
| 7,552,669 B1 * | 6/2009 | Denis et al. | ............ F41H 11/02 |
| 7,612,284 B2 | 11/2009 | Rogers | |
| 7,809,370 B2 | 10/2010 | Stolte | |
| 8,084,724 B1 * | 12/2011 | Brosch et al. | .......... F41G 7/008 |
| 8,487,226 B2 * | 7/2013 | Biswell | ..................... F41G 3/04 |
| 8,678,321 B2 | 3/2014 | Bezos | |
| 8,748,787 B2 * | 6/2014 | Weiss et al. | ............... F41G 3/04 |
| 2004/0007121 A1 * | 1/2004 | Graves et al. | ............. F41G 9/00 |
| 2014/0067164 A1 | 3/2014 | Papadopoulos | |

OTHER PUBLICATIONS

In Praise of the Eastern Range Sep. 2013 Space News Article.
Space-Based Telemetry and Range Safety Project Ku-Band and Ka-Band Phased Array Antenna: NASA Technical Report, Jul. 2005.
Air Force Eastern Range Innovatives, Expedites Access to Space: USAF 45$^{th}$ Space Wing newsletter, Feb. 2017.
Only on Falcon 9: Automated System can Terminate Space-X Rocket Launches: Florida Today newspaper, Mar. 11, 2017.

* cited by examiner

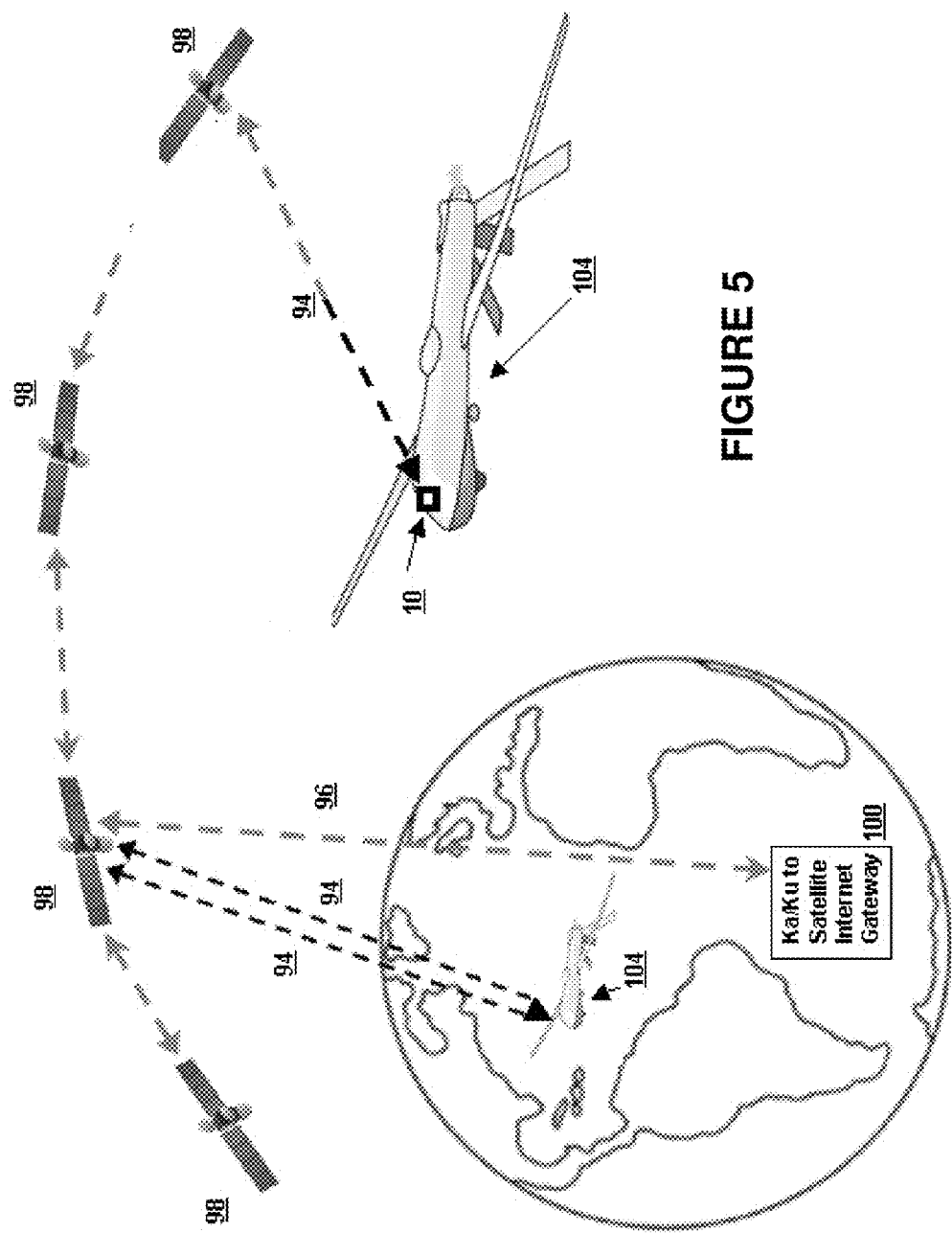

VEHICLE BASED INDEPENDENT RANGE SYSTEM (VBIRS)

CROSS-REFERENCE TO OTHER RELATED APPLICATIONS

This application is the formal patent submission based upon the Provisional Patent No. U.S. 62/334,113 titled, "Vehicle Based Independent Range System" (VBIRS) filed on 10 May 2016.

BACKGROUND

Prior Art following is a tabulation of some prior art that presently appears possibly relevant:

| Pat. No. | Patentee | Issue Date |
| --- | --- | --- |
| U.S. Pat. No. 5,739,787A | E. Burke, et. Al | Apr. 14, 1998 |
| U.S. Pat. No. 6,167,263 | A J. Scott Campbell | Dec. 26, 2000 |
| U.S. Pat. No. 7,612,284 B2 | James E. Rogers, et. Al | Nov. 3, 2009 |
| U.S. Pat. No. 7,809,370 B2 | John Stolte, et. Al | Oct. 5, 2010 |
| U.S. Pat. No. 8,678,321 B2 | Jeff Bezos, et. Al | Mar. 25, 2014 |
| US20140067164 A1 | Papadopoulos, et. Al | Mar. 6, 2014 |

PUBLICATIONS

Cloud Constellation Innovative Space-Based Communications Platform on the website spacebelt.com.

In Praise of the Eastern Range on the website thespacereview.com.

Space-Based Telemetry and Range Safety Project Ku-Band and Ka-Band Phased Array Antenna on the website researchgate.net.

Air Force Eastern Range innovates, expedites access to space on the website Patrick.af.mil.

Only on Falcon 9: Automated system can terminate Space-X rocket launches on the website floridatoday.com.

Until recently, all missiles/rockets launched into orbit or suborbital trajectories have relied upon a ground-based infrastructure (Radar, Telemetry and Flight Termination Ground Sites) to maintain knowledge of its precise ECEF position, velocity and time of the launch vehicle during its flight. Without this knowledge, the launch vehicle could be traveling off course and heading towards a populated area, endangering life and property. Knowledge of the precise location during ascent or reentry allows for the employment of Instantaneous Impact Point (IIP) algorithms to discern when a vehicle could be causing a hazardous situation if allowed to continue off course, and in turn give a human a direct link to a flight termination system on board the launch vehicle whereby the human can destroy the vehicle so all its components would fall to earth in a safe zone without endangering any life or property. During ascent of the launch vehicle and once safely in orbit, the payload aboard that same launch vehicle has relied on ground-based infrastructure to communicate its telemetry data to the customer wherever they are.

Additionally, the largest limiting factor of ground-based telemetry systems is that they can only track one vehicle in flight at a time, thereby severely limiting the amount of vehicles simultaneously under test, with generally 2, possibly 3 reaching the limit of telemetry ground site antenna resources at any given location. This restriction prevents the military from obtaining important simultaneous multi-missile in flight evaluations, and thus precludes the flight-testing and subsequent data gathering for a multi-missile realistic salvo and inter-weapon collaborative targeting scenarios. It is the main purpose of this invention to enable an unlimited number of simultaneous launches with an unlimited telemetry data gathering capability anywhere on the Earth, while enabling real-time communication between the missiles/rockets themselves, structured within an integrated artificial intelligence environment prioritization/weapons assignment and battle damage assessment capability without the need for human intervention.

Recently, the company Space-X has initially demonstrated the use of a GPS tracking device along with an autonomous flight termination system aboard the launch vehicle, thereby taking steps to prove out the safety of eliminating the human monitoring the launch vehicle's position, and necessity of having a human terminate the mission safely so all components fall into an area where life and property isn't endangered. While this is certainly an advancement in the state of the art over radar tracking and having a human ready to destruct a missile/rocket going off course, it doesn't allow for a complete package of launch safety combined with affordable data gathering from any number of launch vehicles on ascent, and subsequently still relies on ground based infrastructure to collect vehicle ascent/orbital data. Additionally, their operations are limited to a ground-based launch because of the inability of their system to communicate its telemetry without a ground infrastructure to receive it, thus precluding an airborne launch of a missile salvo as described above.

It is the object of this invention to provide one common unit for use on all launch vehicles, missiles, reentry vehicles, hypersonic vehicles or even aircraft/Unmanned Aerial Vehicles (UAVS) to enable any missile or rocket to be launched from anywhere on or above the earth without utilizing any ground-based assets for transmitting or receiving any navigation, instrumentation and/or command data from a launch vehicle or payload. The only possible ground based asset involved is a Satellite system gateway that interfaces with the Internet for dissemination of all telemetry and command link vehicle/payload data to any desired location(s) required on the ground, but this additional capability is totally independent of the requirements of this invention. Additionally, the same common equipment of this invention will serve as the judgment system aboard the launch(s) vehicle to discern whether if at anytime a launch vehicle is off course to take appropriate destruct action for precluding any endangerment of life or property, while simultaneously providing real-time telemetry back from an unlimited number of vehicles simultaneously in flight.

To the best of our knowledge, no prior art exists regarding any common unit that can provide the instant and all-inclusive Space Based Range (SBR), Collaborative Weapons Engagement and Autonomous Flight Termination System (AFTS) capability made possible by VBIRS, or even a similar architecture that is adaptable and employable into this capability. There are however a large number of studies on the subject, but none of them have taken the approach employed by this invention, most likely because the authors did not have access to the experience of the inventors in working with complex capabilities such as Doppler Shift and packaging previously independent systems into one unit enclosure with isolated faraday cages operating independently while being powered and communicating together. E. Burke's U.S. Pat. No. 5,739,787A "Vehicle Based Independent Tracking System (VBITS)" discusses in detail the concept of tracking missiles and rockets with an on-board GPS receiver and inertial measurement unit system with the patent also addressing the concept in the claims, that since the launch vehicle knew where it was at all times in flight, it would also have the ability to know when it was off course, and subsequently issue on-board commands to autonomously destroy itself. Claim #1 of the VBITS Patent states "Said Global Positioning System means and Inertial Measurement Unit means interfacing with a microcontroller system means providing power and data flow orchestration within said vehicle based independent tracking system, said microcontroller system means containing gravity software algorithms and switches to autonomously detect life and property threatening non-nominal vehicle performance, and send appropriately responsive destruct commands to said vehicle upon said vehicle's crossing of pre-determined three dimensional time, space and position information range safety limit lines residing in software, said microcontroller system . . . ." This is the autonomous flight termination capability recently employed by Space-X after the cited Burke patent expired. Other patents only tangentially hint at the future possibility of a Space Based Range system, for example, J. Scott Campbell, U.S. Pat. No. 6,167,263A discusses an "Aerial Communications Network" including a plurality of aerial platforms which does not even remotely solve the integrated solution of VBIRS, however it does suggest the concept that future communication systems do not have to be ground-based. James E. Rogers, et. Al, U.S. Pat. No. 7,612,284B2 introduces the concept of a "Space Based Power System" which isn't applicable at all to VBIRS, however it continues to forge the concept of a future where a space-based infrastructure provides the capability of a traditional ground based system. John Stolte, et. Al U.S. Pat. No. 7,809,370 B2 defines a "Space based monitoring of global maritime shipping using automatic identification system" which while innovative, is not applicable at all for adapting to being a VBIRS system, however once again, it shows how thinking Space-Based is the way to go in the future. Jeff Bezos, et. Al, U.S. Pat. No. 8,678,321 B2 defines the progressive concept of rocket reusability, which of its own has nothing to do with a VBIRS capability, however the "New Space" capabilities introduced by Mr. Bezos align synergistically with the "New Space" enablement of VBIRS to further add flexibility and cost effectiveness for launches anywhere on earth, coupled with the lowest cost possible that is a beneficiary of having the launch range Space Based in order not to rely on expensive archaic ground based range infrastructure. Finally, US20140067164 A1 Papadopoulos, et. Al discusses a means for autonomously destroying a vehicle in flight, which is the same isolated function as described in the Space-X references, and initially within the Burke patent claims of U.S. Pat. No. 5,739,787A "Vehicle Based Independent Tracking System". While there are many approaches to autonomously terminating a vehicle in flight as described by the Space-X implementation, the Papadopoulos, et. Al approach, or even the method cited in the Burke patent which was the first, VBIRS is not constrained to any method of autonomous destruct implementation, and is therefore agnostic to the autonomous destruct method. It is also very important to recognize that this single autonomous destruct function is but a minor slice of the entire VBIRS capability that enables the bigger picture capability of ceasing the employment of entire ground-based Range infrastructures. Additionally provided is the crucial capability whereby a direct datalink is present from any vehicle/object to the required orbiting satellite assets during all mission phases, from pre-launch through on-orbit operations while employing cross-links directly between satellites and/or multiple vehicles when required to minimize latency and increase coverage. The additional critical capability enabled by this direct link through LEO/MEO/GEO satellites and/or directly via cross-links between launch vehicles/missiles/UAV's etc., provides the capability of collaborative weapons engagement to enable the unprecedented capability to launch salvos of missiles or rockets in any launch configuration, from air or ground in combination with other assets such as UAV's in a collaboratively networked weapons employment strategy whereby the weapons communicating with each other employ a method of artificial intelligence to internally decide the sequence of weapons employment against any array of targets, with or without human intervention.

The various articles cited by various authors' further paint the picture of the piecemeal, non-integrated approach evident so far regarding a Space Based Range capability. While the "Cloud Constellation Innovative Space-Based Communications Platform" article hints at the great capabilities of a large constellation to serve as a communications network, it falls short of employing the launch vehicle side of things whereby the methodology and systems still need to be identified, developed and employed in the way VBIRS explains. The "In Praise of the Eastern Range" article discusses the advances from the 1950's whereby tracking radars are being shutdown in favor of GPS tracking, and also the autonomous flight termination systems now being fielded for the first time in baby-steps as Space-X recently demonstrated. All this bodes well for the phasing in of a VBIRS system that releases the need for all ground based assets, of which tracking and autonomous flight termination is but a small part, and presently federated as well as proprietary. The article "Space-Based Telemetry and Range Safety Project Ku-Band and Ka-Band Phased Array Antenna" is adapted from a request over 12 years ago by NASA to investigate antenna systems which could be employed by Ka band systems of the future in order to provide high bandwidth to a customer. Since this time, companies such as ViaSat have led the Ka band revolution, and it is systems such as ViaSat's that VBIRS leverages with state-of-the-art technology. The next article "Air Force Eastern Range innovates, expedites access to space" stresses the importance of eventually eliminating ground-based infrastructure in favor of Space-Based assets, with no path identified however that even hints of the all-inclusive capability/intention of VBIRS. As the Autonomous Flight Safety System (AFSS) mature, their robustness will be demonstrated whereby a launch from the Western Range will transit directly past Santa Barbara, Los Angeles and San Diego on its way to a polar orbit, opposed to the equatorial launches accomplished from the Eastern Range where the vehicle(s) are largely overflying open ocean without causing immediate danger to large numbers of lives and property.

Additionally and most importantly, it is supremely important to realize that Space-X's and other companies AFSS is an isolated and proprietary system that as stated previously, only performs a fraction of the responsibilities of VBIRS, and could never be adapted to provide the unprecedented capability to launch salvos of missiles or rockets in any launch configuration from air or ground in combination with other assets such as UAV's in a collaboratively networked weapons employment strategy whereby the weapons communicate with each other employing a method of artificial intelligence to internally decide the sequence of each weapons' employment against an array of targets, with or without human intervention. The final cited article "Only on Falcon 9: Automated system can terminate Space-X rocket launches" again emphasizes the compartmented/proprietary employment of their initial system successfully demonstrated, and while successful in its limited proprietary engagement, it is again just a fraction of the complete end-to-end capability of VBIRS which is completely usable on all missiles and rockets, and provides a capability beyond and unrelated to the simple act of terminating a rocket autonomously.

Due to the nature of these systems cited above, none of these systems can be adapted to the extent of the intent and demands that are required by this invention for the following reasons:

(a) Each of them only performs a small piece of some of the important functions of a Space Based Range, and none of them have considered the complex task of uplinking all vehicle data from pre-launch checkout to payload on orbit operations.

(b) None of them discuss use of a mission-planning tool for recalculating launch points and trajectories in real-time in order to re-accommodate weather changes or air traffic considerations.

(c) Independent piecemeal systems that can't do all the functions required by this system have no way to even adapt their vehicle dependent systems to a universal approach that benefits all launch vehicles and missiles.

(d) No designs feature a dually redundant umbilical detect systems in combination with a countdown timer to allow for ample time prior to arming the flight termination system aboard the vehicle.

(e) None of them discuss the need for removing all fixed ground-based assets that support a launch, including weather profiling.

(f) There are no discussions about a self-contained space qualified battery system functioning independently from a launch vehicle's power system in order to power any such suite of equipment to even piecemeal a few of the functions of this invention.

(g) No references are found as to how testing of salvo of missiles could be accomplished by using the present art, such as the Space-X autonomous flight termination system, as the ground telemetry equipment that they would depend upon would not be able to point to and track more than one missile at a time, thus making salvo testing impossible.

(h) None of these independent systems are capable of being adapted to an aircraft or UAV for remote flying and data gathering/transmission to a node for dissemination.

(i) To piecemeal individual systems together in an effort to even slightly approximate the VBIRS integrated capability would require diverse components adding up to an unacceptable size and weight footprint aboard the vehicle it is intended for, with this piecemealed system not being universally adaptable for use on all missiles, rockets, UAV's and aircraft.

(j) No capability exists in any of these other piecemeal systems to provide an integrated system tying together multiple missiles, rockets, aircraft and UAV's for purposes of conducting a coordinated salvo launch capability from any location and between any desired assets.

(k) No capability exists for tying together assets in a cooperative weapon engagement scenario whereby the missiles can communicate with each other for structuring the best target attack plan autonomously between assets, as well as having a human in the loop performing real-time mission planning.

SUMMARY

The summation of all these lacking capabilities serve to indicate why no prior art regarding a Space Based Range capability in the form of a Vehicle Based Independent Range System exists, with only some minor components of which being spottily manifested amongst several splintered functions as built by independent individuals or companies. In order for a Space Based Range to be a true robust and routinely usable asset which completely eliminates all ground based infrastructure, all aspects of a missile or rocket mission must be explored and addressed to be easily accommodated into a system such as VBIRS in order to drive the cost of a launch down to affordable levels whereby a true level playing field is available to all who require the simplest and most elegant way to track their vehicle with a huge data flow capability being present from pre-launch checkout, all the way through the end of life of its payload in space. Additionally, without a VBIRS system, coordinated salvo launches and air sorties could never be combined into a simple employable system that also makes possible cooperative weapons engagement whereby multiple assets communicate amongst each other either prior to or while in flight in order to optimize their employment against a target field.

Advantages

Accordingly, the objects and advantages of this invention are to incorporate all attributes necessary to instantly manifest a Space Based Range capability which can be used on any missile, rocket and even aircraft or UAV where large data volumes are required from any operational area, whether inside or outside of the atmosphere. Additionally, the qualities of modularity, scalability, flexibility, stackability, interconnectivity, adaptability, reconfigurability, consolidation and interchangeability in a single unit combining the functions of RF (wireless communication), processor, data communication and I/O, EMI/RFI isolation (radiative and conductive emissions), and power which can instantly function within benign atmospheric conditions, and up through the atmosphere into the vacuum and intense temperature extremes of space, as well as survive the high shock and vibration environment of missile/rocket transit in-between these locations. While major operational and cost benefits are instantly available to a single user with this invention whether they be government or commercial, a larger application for military benefit becomes quickly apparent whereby integrated operations are now possible between any number of assets desired to be employed with an unlimited number of salvo launches, with each asset essentially being a flying IP Address, and additionally having the capability to communicate between one another during any mission phase, thereby allowing the most effective means to smartly employ a variety of weapons against a variety of targets through the weapons themselves communicating with each other in a collaborative environment.

DRAWINGS

Figures

Figure 2:
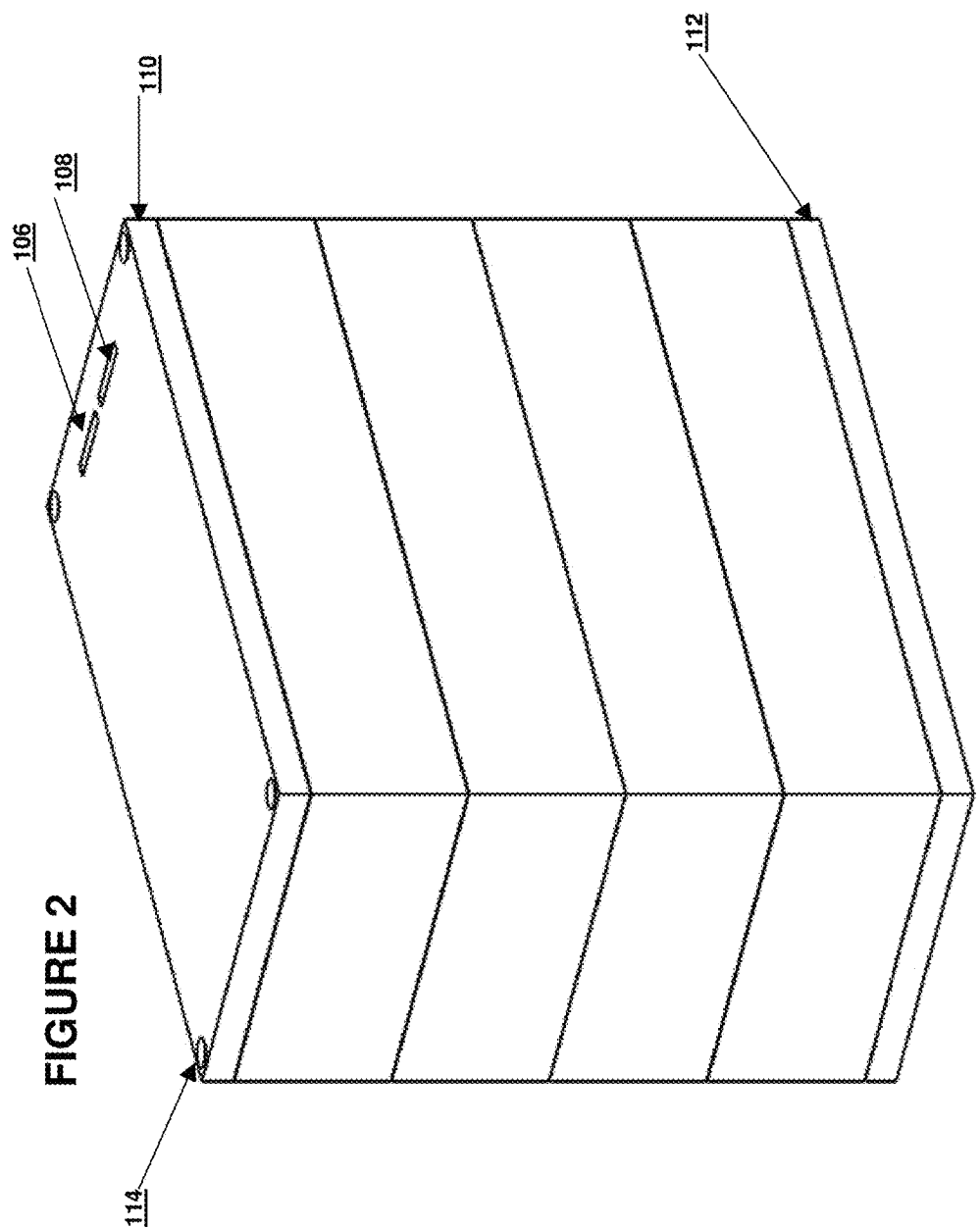
Figure 3:
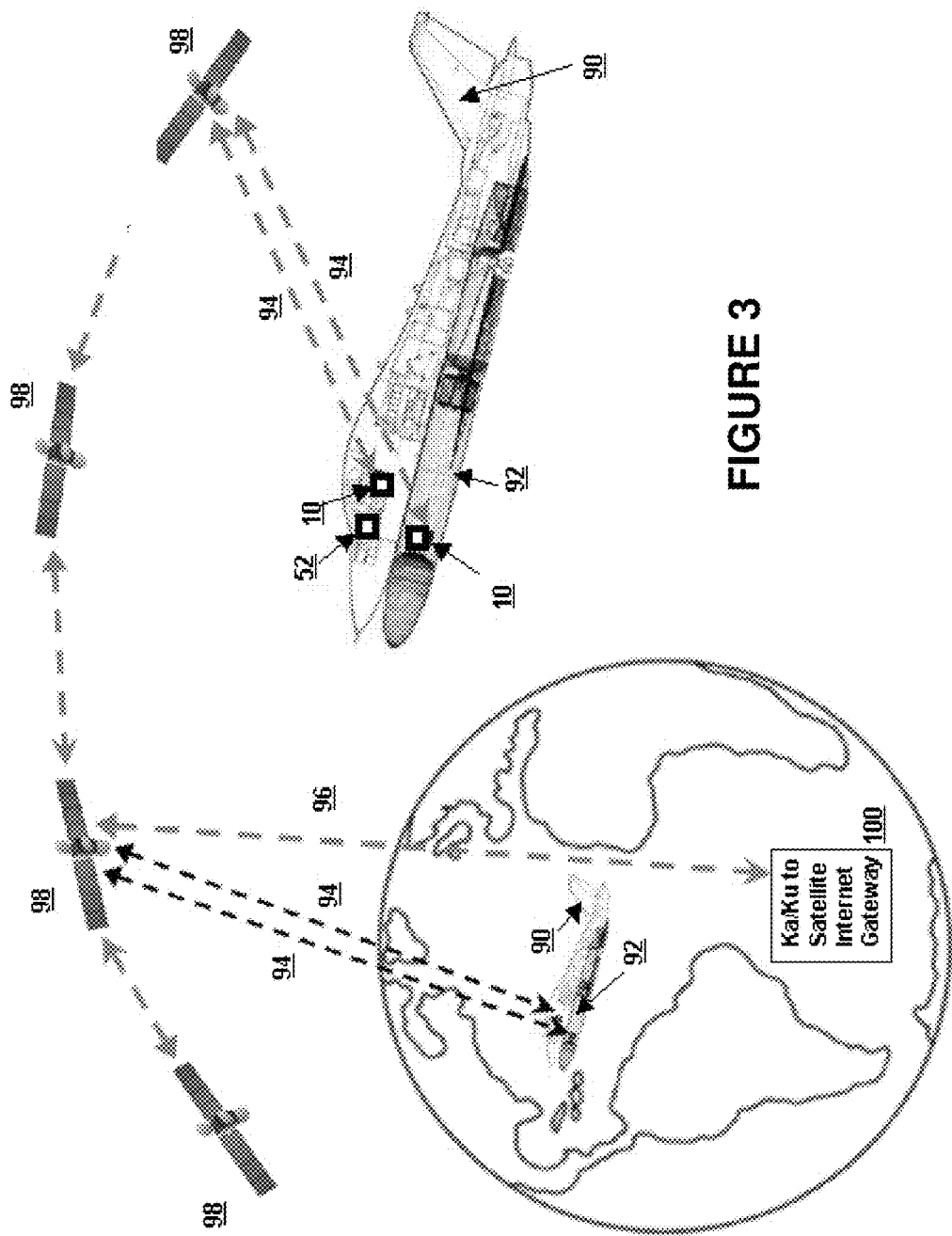
Figure 4:
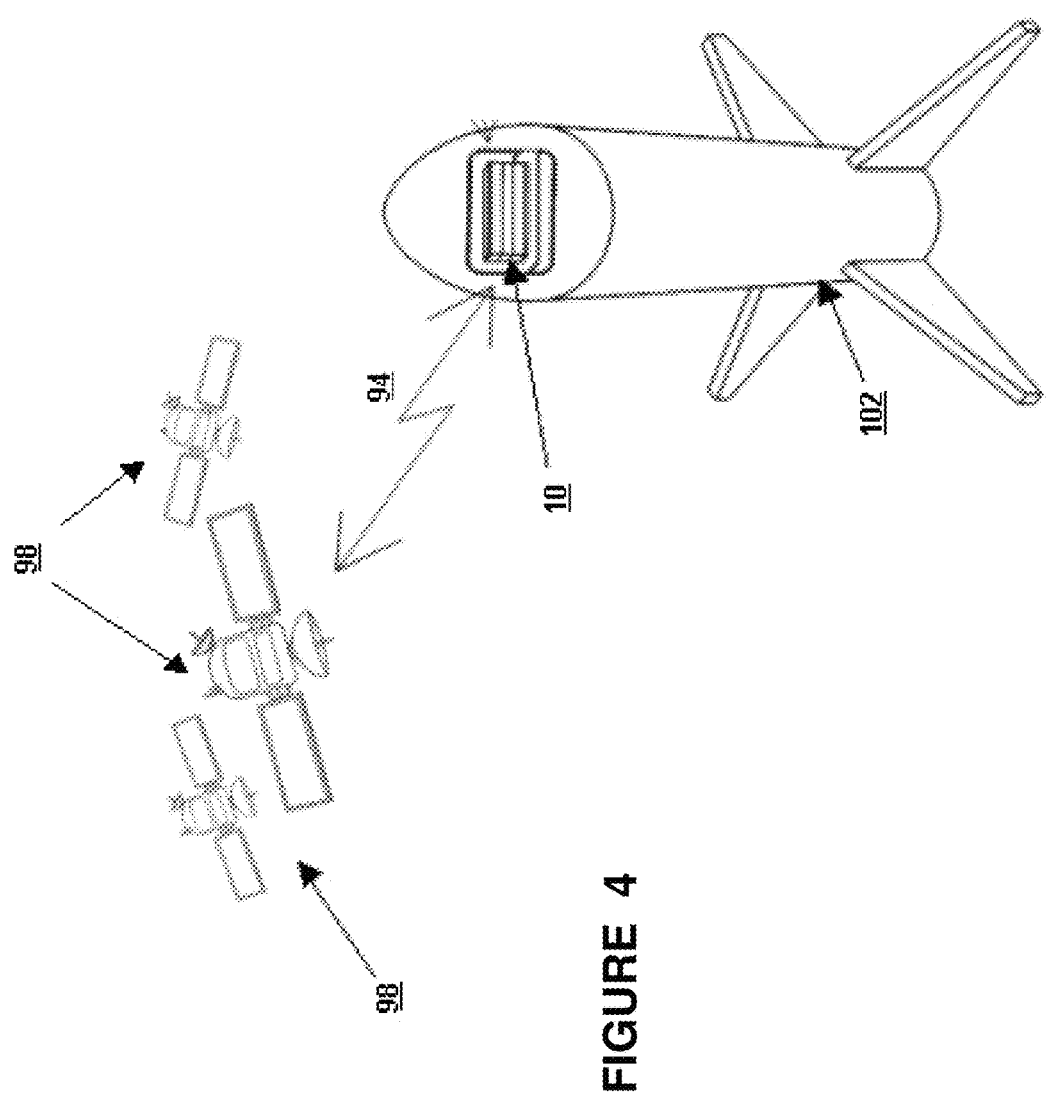

FIG. 1. is a schematic diagram of the VBIRS modules, which make up a single system FIG. 2. is a drawing of a preferred physical embodiment of VBIRS assembled as a single unit FIG. 3. shows a VBIRS unit aboard a launch aircraft and a rocket it is carrying for launch FIG. 4. depicts a VBIRS unit aboard a rocket on a fixed ground launch site FIG. 5. illustrates a VBIRS unit aboard a UAV

REFERENCE NUMERALS 10 vehicle based independent range system (VBIRS)
12 power module 1
14 28 volt DC battery
16 DC to DC converter/EMI filter
18 power distribution subset
20 artificial intelligence/autonomous engagement/flight termination system module 2
22 autonomous engagement controller
24 vehicle propulsion controller
26 vehicle/ordnance destruct systems
28 vehicle component separation system
30 satellite data modem module 3 system
32 satellite modem
34 satellite downlink antenna controller
36 satellite uplink antenna controller
38 Ka/Ku satellite antenna
40 navigation, comm and control module 4 system
42 radiation tolerant data processing and comm system
44 GPS receiver system
46 inertial measurement unit (IMU)
48 GPS antenna combiner
50 GPS antenna system
52 VBIRS test and checkout system
54 power module 1 output
56 battery output cable
58 power converter output cable
60 autonomous destruct controller to propulsion controller interface cable
62 autonomous destruct controller to vehicle component separation system RS-422 interface cable
64 autonomous destruct controller to ordinance interface cable
66 antenna pointing and modem Doppler shift correction interface cable
68 antenna downlink controller to satellite modem interface
70 satellite modem to antenna uplink controller interface
72 satellite modem antenna to modem downlink controller interface cable
74 satellite modem antenna to modem uplink controller interface cable
76 comm and data system to autonomous destruct controller interface
78 GPS combiner to GPS receiver RS-422 interface cable
80 IMU to comm and data system Serial Peripheral Interface (SPI) Bus interface
82 GPS receiver to comm and data system RS-422 interface cable
84 checkout and test RS-422 interface for all modules
86 external charging/bypass power for module 1
88 charging/bypass power to module 1 power interface
90 missile or rocket launching aircraft
92 missile or rocket for airlaunch
94 bi-directional link between VBIRS and communication satellite
96 bi-directional link between Ka/Ku band satellite constellation and internet gateway
98 earth orbiting communication Ka/Ku band crosslinked satellite constellation
100 Ka/Ku satellite to internet gateway
102 ground launched missile or rocket
104 Unmanned Aerial Vehicle
106 checkout and test access connector
108 external power access connector
110 module cover plate
112 module base plate
114 stack securing bolts
116 weather data
118 weather data interface connection
120 controller interface connection

DETAILED DESCRIPTION

FIGS. 1-5

A 10 vehicle based independent range system (VBIRS) as illustrated in FIGS. 1-5 is comprised of stackable modules 12 power module 1, 20 artificial intelligence/autonomous engagement/flight termination system module 2, 30 satellite data modem module 3 system and 40 navigation, comm and control module 4 system, while being adaptable to configuring with more modules or less modules depending on mission requirements.

In FIG. 1, the details of the internal functions of the stackable modules along with their associated major interfaces are discussed. In module 1, 12 power module 1 is internally comprised of 14 28 volt DC battery, 56 battery output cable to 16 DC to DC converter/EMI filter which is subsequently connected via 58 battery output cable to 18 power distribution subset. The 54 power module 1 output serves power to modules 1-4 to provide them with uninterrupted clean power, while 84 checkout and test RS-422 interface for all modules connects with 52 VBIRS test and checkout system for monitoring all required battery parameters of 12 power module 1. 20 artificial intelligence/autonomous engagement/flight termination system module 2 is comprised of an inherent artificial intelligence capability enveloping 22 autonomous engagement controller which contains all destruct/engagement decision making software and range safety algorithm parameters required to make the best destruct or weapon engagement decision possible, with these two intertwined systems interfaced to each other via 120 controller interface connection. 22 autonomous engagement controller also connects with the 42 radiation tolerant data processing and comm system of 40 navigation, comm and control module 4 system via 76 comm and data system to autonomous destruct controller interface while simultaneously connecting to 24 vehicle propulsion controller via 60 autonomous destruct controller cable, and also 26 vehicle/ordnance destruct systems via 64 autonomous destruct controller to ordinance interface cable and 28 vehicle component separation system via 62 autonomous destruct controller cable. 30 satellite data modem module 3 system communicates directly with 98 earth orbiting communication Ka/Ku band crosslinked satellite constellation via 38 Ka/Ku satellite antenna which connects to 34 satellite downlink antenna controller via 72 satellite modem antenna to modem downlink controller interface cable and 36 satellite uplink antenna controller via 74 satellite modem antenna to modem uplink controller interface cable. The output of 34 satellite downlink antenna controller connects to 32 satellite modem via 68 antenna downlink controller to satellite modem interface and the output of 32 satellite modem connects to 36 satellite uplink antenna controller via 70 satellite modem to antenna uplink controller interface. The output of 32 satellite modem connects directly to 42 radiation tolerant data processing and comm system of 40 navigation, comm and control module 4 system via 66 antenna pointing and modem Doppler shift correction interface cable.

40 navigation, comm and control module 4 system interfaces with 20 artificial intelligence/autonomous engagement/flight termination system module 2 and 30 satellite data modem module 3 system as previously mentioned while simultaneously interfacing to 52 VBIRS test and checkout system via 84 checkout and test RS-422 interface for all modules of 10 vehicle based independent range system (VBIRS). 50 GPS antenna system allows for derivation of present position and velocity of 90 missile or rocket launching aircraft, 92 missile or rocket for airlaunch, 102 ground launched missile or rocket or 104 Unmanned Aerial Vehicle via 50 GPS antenna system interfacing with 44 GPS receiver system via 48 GPS antenna combiner connected with 44 GPS receiver system via 78 GPS combiner to GPS receiver RS-422 interface cable in order to resolve aforementioned position and velocity parameters of all vehicles employing 10 vehicle based independent range system (VBIRS). 44 GPS receiver system interfaces directly with 42 radiation tolerant data processing and comm system via 82 GPS receiver to comm and data system RS-422 interface cable while 42 radiation tolerant data processing and comm system also interfaces with 46 inertial measurement unit (IMU) via connection 80 IMU to comm and data system Serial Peripheral Interface (SPI) Bus interface, as well as 116 weather data and 118 weather data interface connection.

In FIG. 2, a preferred embodiment of 10 vehicle based independent range system (VBIRS) is depicted illustrating the stacked assembly of 12 power module 1, 20 artificial intelligence/autonomous engagement/flight termination system module 2, 30 satellite data modem module 3 system and 40 navigation, comm and control module 4 system. Additionally depicted is 110 module cover plate and 112 module base plate which securely sandwiches 12 power module 1, 20 artificial intelligence/autonomous engagement/flight termination system module 2, 30 satellite data modem module 3 system and 40 navigation, comm and control module 4 system between them via 114 stack securing bolts traversing through all modules and anchoring via a threaded receptacle in all four corners of 112 module base plate. Additionally depicted is 106 checkout and test access connector and 108 external power access connector, both of which are integral with 110 module cover plate, whereby access is gained to 84 checkout and test RS-422 interface for all modules and 88 charging/bypass power to module 1 power interface.

FIG. 3 illustrates the direct interface of 10 vehicle based independent range system (VBIRS) with 98 earth orbiting communication Ka/Ku band crosslinked satellite constellation while also describing the adaptability of a 10 vehicle based independent range system (VBIRS) aboard a 90 missile or rocket launching aircraft whereby all functions of 10 vehicle based independent range system (VBIRS) are required with the possible exception of the flight termination component of 20 artificial intelligence/autonomous engagement/flight termination system module 2 because one would not normally need to provide the function of destroying the manned aircraft carrying a 92 missile or rocket for airlaunch. One could however still employ the flight termination component of 20 artificial intelligence/autonomous engagement/flight termination system module 2 if desired aboard a 90 missile or rocket launching aircraft when desired if the aircraft is in the vicinity of enemy territory and an ejecting pilot does not desire the remnants of the aircraft to fall into enemy hands. The 90 missile or rocket launching aircraft additionally contains a 52 VBIRS test and checkout system in order to provide a self-contained mission control and launch capability aboard 90 missile or rocket launching aircraft. A 52 VBIRS test and checkout system can also be located anywhere on earth in addition to or in place of being aboard 90 missile or rocket launching aircraft by providing data to anyone required to participate on earth or even aboard another 90 missile or rocket launching aircraft which may or not be carrying a 92 missile or rocket for airlaunch. By networking numerous 90 missile or rocket launching aircraft in flight with other 92 missiles or rockets for airlaunch, one can provide for a coordinated salvo missile launch capability with unlimited numbers of missiles participating, including ground launched missile or rocket assets such as 102 ground launched missile or rocket depicted in FIG. 4. An additional means of terrestrial connection to participants involved in the airlaunch campaign is via a simple internet connection as derived from the 100 Ka/Ku satellite to internet gateway via a 96 bidirectional link between Ka/Ku band satellite constellation and internet gateway 98 earth orbiting communication Ka/Ku band crosslinked satellite constellation.

As mentioned, FIG. 4 illustrates the unlimited flexibility and capability of a 10 vehicle based independent range system (VBIRS) aboard a 102 ground launched missile or rocket that interfaces directly to 98 earth orbiting communication Ka/Ku band crosslinked satellite constellation via 94 bi-directional link between VBIRS and communication satellite, functioning in an exact manner to 92 missile or rocket for airlaunch.

FIG. 5 describes the exact same employment of 10 vehicle based independent range system (VBIRS) aboard a 104 Unmanned Aerial Vehicle, communicating in the identical manner with 98 earth orbiting communication Ka/Ku band crosslinked satellite constellation via 94 bi-directional link between VBIRS and communication satellite. Although not depicted in FIG. 5, it is easily understood that 104 Unmanned Aerial Vehicle could also carry a 92 missile or rocket for airlaunch in the exact same manner that 90 missile or rocket launching aircraft does, and also provide the interconnected and collaboratively connected salvo capability of 92 missiles or rockets for airlaunch and also in concert with 102 ground launched missiles or rockets. As in FIG. 3's depiction of 90 missile or rocket launching aircraft carrying 92 missile or rocket for airlaunch, the 104 Unmanned Aerial Vehicle has the option to include 20 artificial intelligence/autonomous engagement/flight termination system module 2 if the 104 Unmanned Aerial Vehicle is operating in the vicinity of enemy territory, and the remote control pilot does not desire any usable remnants of 104 Unmanned Aerial Vehicle to fall into enemy hands if it crashes.

Operation—FIGS. 1-5

The 10 vehicle based independent range system (VBIRS) as fully illustrated in FIGS. 1-5 has solved the design and operation complexities required to finally manifest a turnkey range safety, communications and data system for immediate use on all launch and aerial vehicles, thereby enabling the complete shut down of all ground infrastructure previously required to conduct a space or missile ballistic launch, while simultaneously enabling a simple and dynamic salvo launch capability amongst 92 missiles or rockets to autonomously occur within a collaborative environment whereby all assets communicate with each other for optimized autonomous asset on target allocations to be prioritized amongst the assets, or engaged via human intervention. Additionally, 10 vehicle based independent range system (VBIRS) is the first ever manifestation of a truly modular, stackable, scalable, flexible, inter-connectable, adaptable, reconfigurable, consolidated and interchangeable system combining the functions of RF, data processing, data communication and power while simultaneously solving complex Doppler Shift dynamics required in order to envelope operations with the high bandwidth Ka/Ku band. The 10 vehicle based independent range system (VBIRS) design features an EMI/RFI chamber design that integrates all complex interchangeable hardware, software and firmware into a single unit for ease of design, manufacture, space qualification testing, troubleshooting and field employment, all in a one-box system.

The 10 vehicle based independent range system (VBIRS) as illustrated in FIGS. 1-5 is comprised of stackable modules 12 power module 1, 20 artificial intelligence/autonomous engagement/flight termination system module 2, 30 satellite data modem module 3 system and 40 navigation, comm and control module 4 system, while being adaptable to configuring with more modules or less modules depending on mission requirements. These modules contain all the active hardware necessary for a complete and flexible system to be assembled and fielded in an unprecedented short period of time to meet any 92 missile or rocket for airlaunch, 102 ground launched missile or rocket and 104 Unmanned Aerial Vehicle requirement.

In FIG. 1, the details of the internal operational functions of the stackable modules along with their associated major interfaces are discussed. In module 1, 12 power module 1 is internally comprised of a self-contained 14 28 volt DC battery utilizing any chemistry, while being adaptable to any future battery chemistry, 56 battery output cable to 16 DC to DC converter/EMI filter ensures that the power is clean and isolated from all RF and other possible interferences, which is subsequently connected via 58 battery output cable to 18 power distribution subset which contains all the required conditioned power for operating 44 GPS receiver system, 42 radiation tolerant data processing and comm system and all other systems comprising 12 power module 1, 20 artificial intelligence/autonomous engagement/flight termination system module 2, 30 satellite data modem module 3 system and 40 navigation, comm and control module 4 system. 84 checkout and test RS-422 interface for all modules connects with 52 VBIRS test and checkout system for monitoring all required battery parameters of 12 power module 1, while simultaneously allowing for monitoring and control of all hardware and software comprising 10 vehicle based independent range system (VBIRS) in addition to having the capability to interoperatively display all desired data available from all other 52 VBIRS test and checkout systems that are part of a distributed network of salvo assets in addition to 104 Unmanned Aerial Vehicle reconnaissance to be engaged against targets.

20 artificial intelligence/autonomous engagement/flight termination system module 2 is comprised of 22 autonomous engagement controller containing all asset employment scenario software hooks in addition to destruct decision making software and range safety algorithm parameters required to make the best destruct decision possible, depending on the employment scenario the asset is fielded in and interfaces with 20 artificial intelligence/autonomous engagement/flight termination system module 2 via 120 controller interface connection. 22 autonomous engagement controller connects with the single event upset (SEU) immune 42 radiation tolerant data processing and comm system of 40 navigation, comm and control module 4 system via 76 comm and data system to autonomous destruct controller interface while simultaneously connecting to 24 vehicle propulsion controller via 60 autonomous destruct controller cable in order to command a termination of any manner of propulsion, and also 26 vehicle/ordnance destruct systems having the capability to destroy/fragment any vehicle depending upon the explosive configuration via 64 autonomous destruct controller to ordinance interface cable and 28 vehicle component separation system via 62 autonomous destruct controller cable, thereby allowing for complete destruction of the vehicle while in flight for safety or security reasons.

The very important component of 10 vehicle based independent range system (VBIRS) is 30 satellite data modem module 3 system communicates directly with 98 earth orbiting communication Ka/Ku band crosslinked satellite constellation via 38 Ka/Ku satellite antenna which connects to 34 satellite downlink antenna controller via 72 satellite modem antenna to modem downlink controller interface cable and 36 satellite uplink antenna controller via 74 satellite modem antenna to modem uplink controller interface cable. The output of 34 satellite downlink antenna controller connects to 32 satellite modem via 68 antenna downlink controller to satellite modem interface and the output of 32 satellite modem connects to 36 satellite uplink antenna controller via 70 satellite modem to antenna uplink controller interface. The output of 32 satellite modem connects directly to 42 radiation tolerant data processing and comm system of 40 navigation, comm and control module 4 system via 66 antenna pointing and modem Doppler shift correction interface cable. The capability enabled via 30 satellite data modem module 3 system allows for the first time application of maintaining communications between a 92 missile or rocket for airlaunch and/or a 102 ground launched missile or rocket from a pre-launch checkout stage, through ascent to orbit and then once on-orbit, providing high-speed data via Ka/Ku band communications for the lifetime of the satellite in orbit.

The operation of the 40 navigation, comm and control module 4 system with 20 artificial intelligence/autonomous engagement/flight termination system module 2 and 30 satellite data modem module 3 system as previously mentioned while simultaneously interfacing to 52 VBIRS test and checkout system via 84 checkout and test RS-422 interface for all modules while providing all position and velocity computation parameters. 50 GPS antenna system allows for the derivation of the present position and velocity of a 90 missile or rocket launching aircraft, 92 missile or rocket for airlaunch, 102 ground launched missile or rocket or 104 Unmanned Aerial Vehicle via 50 GPS antenna system interfacing with 44 GPS receiver system via 48 GPS antenna combiner connected with 44 GPS receiver system via 78 GPS combiner to GPS receiver RS-422 interface cable. 44 GPS receiver system interfaces directly with SEU Immune 42 radiation tolerant data processing and comm system via 82 GPS receiver to comm and data system RS-422 interface cable while 42 radiation tolerant data processing and comm system also interfaces with 46 inertial measurement unit (IMU) via connection 80 IMU to comm and data system Serial Peripheral Interface (SPI) Bus interface, thereby solving all navigation requirements of 10 vehicle based independent range system (VBIRS) while simultaneously taking in all pertinent weather data for an entire launch area or theatre via 116 weather data sources, and input into 42 radiation tolerant data processing and comm system via 118 weather data interface connection. Weather plays an enormous factor when launching a missile or rocket, and 42 radiation tolerant data processing and comm system passes that data along to 22 autonomous engagement controller for processing along with 20 artificial intelligence/autonomous engagement/flight termination system module 2 in order to define all launch/theatre parameters for the launch to proceed with the highest degree of mission success.

In FIG. 2, a preferred operational embodiment of 10 vehicle based independent range system (VBIRS) is depicted illustrating the range safety qualified assembly stacked configuration of 12 power module 1, 20 artificial intelligence/autonomous engagement/flight termination system module 2, 30 satellite data modem module 3 system and 40 navigation, comm and control module 4 system. Additionally depicted is 110 module cover plate and 112 module base plate which securely sandwiches 12 power module 1, 20 artificial intelligence/autonomous engagement/flight termination system module 2, 30 satellite data modem module 3 system and 40 navigation, comm and control module 4 system between them via 114 stack securing bolts traversing through all modules and anchoring via a threaded receptacle in all four corners of 112 module base plate, enabling this arrangement of modules into one unit to easily pass all qualification testing required for launch and orbit applications. Additionally depicted is 106 checkout and test access connector and 108 external power access connector, both of which are integral with 110 module cover plate, whereby access is gained to 84 checkout and test RS-422 interface for all modules and 88 charging/bypass power to module 1 power interface for ease of employment at any operational location on any vehicle.

FIG. 3 operationally describes the RF link interface of 10 vehicle based independent range system (VBIRS) with an 98 earth orbiting communication Ka/Ku band crosslinked satellite constellation while also describing the adaptability of a 10 vehicle based independent range system (VBIRS) aboard a 90 missile or rocket launching aircraft whereby all functions of 10 vehicle based independent range system (VBIRS) are required with the likely exception of 20 artificial intelligence/autonomous engagement/flight termination system module 2, due to one not normally needing to provide the function of destroying a manned aircraft carrying a 92 missile or rocket for airlaunch. One could however still employ the flight termination aspect of 20 artificial intelligence/autonomous engagement/flight termination system module 2 if desired aboard a 90 missile or rocket launching aircraft if necessary, given the aircraft is in the vicinity of enemy territory and an ejecting pilot does not desire any remnants of the aircraft or its classified cargo to fall into enemy hands. The 90 missile or rocket launching aircraft additionally contains a 52 VBIRS test and checkout system for a pilot to operate in order to create a self-contained mission control and launch capability aboard 90 missile or rocket launching aircraft. A 52 VBIRS test and checkout system can also be located anywhere on earth in addition to or in place of being aboard 90 missile or rocket launching aircraft by providing data to anyone required to participate on earth or even aboard another 90 missile or rocket launching aircraft which may or not be carrying a 92 missile or rocket for airlaunch. The networking of numerous 90 missile or rocket launching aircraft in flight in addition to other 92 missiles or rockets for airlaunch and/or 102 ground launched missiles or rockets, one can operate a coordinated salvo missile launch capability with unlimited numbers of missiles participating, including ground launched missile or rocket assets. An additional means of terrestrial operational connection with participants involved in an airlaunch and/or ground launch campaign is via a simple internet connection via the 100 Ka/Ku satellite to internet gateway via a 96 bi-directional link between Ka/Ku band satellite constellation and internet gateway 98 earth orbiting communication Ka/Ku band crosslinked satellite constellation. In the configuration depicted in FIG. 3, if 92 missile or rocket for airlaunch is for launching a payload into space, then 20 artificial intelligence/autonomous engagement/flight termination system module 2 would nominally employ software for autonomous flight termination, however if 92 missile or rocket for airlaunch is a missile, and perhaps one of many in a salvo, then the autonomous engagement capability of 20 artificial intelligence/autonomous engagement/flight termination system module 2 would be featured, and if required depending upon launch scenario, employment a flight termination capability would be employed for safety of the launching and/or fleet assets which may be in the vicinity of the launch.

FIG. 4 once again illustrates the operational flexibility and capability of a 10 vehicle based independent range system (VBIRS) aboard a 102 ground launched missile or rocket that interfaces directly to 98 earth orbiting communication Ka/Ku band crosslinked satellite constellation via 94 bi-directional link between VBIRS and communication satellite, functioning in an exact manner to 92 missile or rocket for airlaunch. Once again, and as depicted in FIG. 4, if 92 missile or rocket for airlaunch is for launching a payload into space, then 20 artificial intelligence/autonomous engagement/flight termination system module 2 would nominally employ software for autonomous flight termination, however if 92 missile or rocket for airlaunch is a missile, and perhaps one of many in a salvo, then the autonomous engagement capability of 20 artificial intelligence/autonomous engagement/flight termination system module 2 would be featured, and if required depending upon launch scenario, employment a flight termination capability would be employed for safety of the launching and/or fleet assets which may be in the vicinity of the launch.

FIG. 5 is an operational depiction of the employment of 10 vehicle based independent range system (VBIRS) aboard a 104 Unmanned Aerial Vehicle communicating in the identical manner as in all previous Figures with 98 earth orbiting communication Ka/Ku band crosslinked satellite constellation via a 94 bi-directional link between VBIRS and communication satellite. Not depicted in FIG. 5 yet easily understood is that 104 Unmanned Aerial Vehicle is also battle-ready to carry a 92 missile or rocket for airlaunch in the exact same manner that 90 missile or rocket launching aircraft does, while also providing an interconnected and collaboratively engaged salvo capability of 92 missiles or rockets for airlaunch in combination with any assortment of 102 ground launched missiles or rockets. Similarly to FIG. 3's depiction and description of a 90 missile or rocket launching aircraft carrying 92 missile or rocket for airlaunch, the 104 Unmanned Aerial Vehicle has the option to include the 20 artificial intelligence/autonomous engagement/flight termination system module 2 if the aircraft is operating in the vicinity of enemy territory, and the remote control pilot does not desire the remnants of 104 Unmanned Aerial Vehicle to fall into enemy hands if a mishap occurs. Additionally, as described in Figure's 3 and 4 above, if the UAV is carrying a 92 missile or rocket for airlaunch into space, then 20 artificial intelligence/autonomous engagement/flight termination system module 2 would nominally employ software for autonomous flight termination, however if 92 missile or rocket for airlaunch aboard 104 Unmanned Aerial Vehicle is a missile, and perhaps one of many in a salvo being launched from other 104 Unmanned Aerial Vehicles, 90 missile or rocket launching aircraft or is a 102 ground launched missile or rocket, then the autonomous engagement capability of 20 artificial intelligence/ autonomous engagement/flight termination system module 2 would be featured, and if required depending upon launch scenario, employment a flight termination capability would be employed for safety of the launching area and/or fleet assets which may be in the vicinity of the launch.

ADVANTAGES

The above description distills the essence of the invention into the key component and integrated capabilities which illustrate the unprecedented aspect of this invention being the first time a single suite of inexpensive vehicle-based hardware in a small package can entirely replace all ground infrastructure comprised of antiquated expensive to operate and maintain and ultimately unsustainable hardware and software which causes huge amounts of Defense Department dollars to be continuously spent in order to keep this equipment alive and certified for use. In addition, it is important to realize that unlike the ground-based infrastructure it will replace, this invention provides the unprecedented capability to launch salvos of missiles or rockets in any launch configuration from air or ground in combination with other assets such as UAV's in a collaboratively networked weapons employment strategy whereby the weapons communicate with each other employing a method of artificial intelligence to internally decide the sequence of each weapons' employment against an array of targets, with or without human intervention, with more detailed qualities and capabilities being further described as follows:

1) The integrated plug and play aspects of modules 1-4 form the backbone of a flexible and easily upgradeable open architecture that synergistically includes all necessary components required to deploy a complete Space Based Range system in a single unit to employ all applications required from pre-launch through orbit, or if utilized for a weapon application, this system provides the capability for collaborative weapons employment from pre-launch mission planning and vehicle checkout through the most advantageous employment of that weapon for use against any array of targets and in combination with any mix of missiles collaboratively operating in the same theatre for the best coordinated attack to smartly employ each missile.

2) Through employment of all targeting algorithms in combination with artificial intelligence simultaneously being processed between modules 2 and 4, not only is mission planning an essential baseline of this invention, it is also dynamically capable of real-time re-calculation in a weapons employment environment to best employ all networked assets in the most effective manner.

3) This invention is the first integrated approach that solves all the undesirable aspects associated with the antiquated Range ground launch infrastructures which eliminates the huge Defense Department expenditures that are required to operate and maintain all that ground based infrastructure, while also providing much needed new capabilities which are not possible with the existing ground-based infrastructure, and benefits all launch vehicles.

4) This invention employs the safest approach for deploying an air launched missile or rocket from an aircraft by utilizing a dually redundant umbilical detect system in combination with a countdown timer, allowing an ample safety margin timeline to be employed.

5) This central core reason for this invention is the absolute need for removing all fixed ground-based assets that support a launch, and this includes weather profiling which is ingested from all independent sources.

6) VBIRS employs a self-contained space qualified battery or power system that is sized to suit the mission of employment, which even includes the operation of VBIRS on-orbit for many years during the lifetime of the payload in order to power the system during practically countless transits over the darkside of the earth.

7) VBIRS inherent nature is to be the enabling system of missile salvos and data gathering, coupled with its self contained capability to allow for collaborative weapons engagements where by missiles are in communication with each other prior to and after launching, in order to optimize weapon employment against the threat targets, along with an instant 'on the fly' retargeting capability.

8) This invention is flexible and scalable for any operation, from use aboard a single missile or rocket for Range Safety operations, and for use in the most complex of environments where an aircraft is the missile or rocket launching platform of a single or multiple number of missiles/rockets, with the ultimate application of the system being where many missiles or rockets are launched in a salvo, and being coordinated amongst other aircraft and UAV's in theatre.

9) The VBIRS system is elegant, small, lightweight, and adaptable for practically any size missile or rocket or aircraft/UAV platform while providing the full capability regardless of vehicle size.

10) The employment of VBIRS is universally adaptable, and therefore affords the capability of employment at or from any location with any suite of mixed assets being aircraft, missiles, rockets UAV's, and ground/sea based if desired, as the platform can be mounted on anything.

11) VBIRS essentially turns any theatre of operation into an array of IP addresses, all collaboratively communicating with each other, regardless of their position on earth, in space, or any location between. The artificial intelligence aboard VBIRS allows for instant weapon on target scenario evaluation to occur 'on the fly', and for re-targeting to occur based upon intel gathered while in transit, to therefore prevent a weapon from attempting to engage a target which may have already been eliminated by another weapon in theatre. The same application is employed in the simpler scenario where safe transit through airspace is the only issue, and then to solely provide data from the vehicle/payload for the lifetime of its mission.

CONCLUSION, RAMIFICATIONS AND SCOPE

Given the entire detailed description above, it is instantly apparent that this first Vehicle Based Independent Range System is instantly employable aboard any missile or rocket launch from anywhere on earth, whether it is from a ground-based launch pad or if a single/any number of missiles/rockets are released from a single or multiple manned or unmanned aircraft in flight. All pre-launch checkouts performed aboard a missile or rocket involves the data streaming of all vehicle/payload data to a control center located anywhere, whereby a launch decision is made in concert with predicted weather along the planned route of flight, with the ability of this system to instantly avail any number of alternate flight plans if weather could be a factor for mission success or safety during flyout. Sequentially, once in flight, VBIRS has the on-board capability to compare its planned route of flight to its actual real-time route of flight, and if off course will then attempt to restore it to the safe corridor, or command a destruct of the vehicle if it has internally determined that continued powered flight would endanger life or property. If the vehicle is intended for orbit and arrives there safely, the same communication system interfacing with a designated high bandwidth satellite for all ground checkout and flight data would then provide the data for that satellite for the lifetime of the mission, thereby capitalizing on the same hardware used for pre-launch checkout, all the way to orbit insertion, and for the subsequent life of the mission.

If the Vehicle Based Independent Range System is employed on a missile for ballistic flight or a more local weapons delivery, the same pre-launch capability data flow sequence applies from above. If more than one weapon is employed up through any number of weapons that would be considered a salvo of launches, each asset essentially becomes a flying IP Address, whereby all weapons are networked together, and are able to communicate between one another during any mission phase. This capability thereby enables the most effective means to smartly employ and deploy a variety of weapons against a variety of targets via the weapons themselves communicating with each other in a real-time a collaborative environment and exchanging real-time information. This real-time information exchange between weapons enables the smartest targeting decisions to occur amongst the weapons themselves, where by if one weapon destroys a target, the other weapons in theatre will be provided with instant instructions to avoid that destroyed target, and hence sequence to the next order of targets.

While major disruptive operational and cost benefits are instantly available to a customer with this invention whether they be government or commercial, the immense capabilities gained along with the shutdown and removal of all legacy ground systems instantly levels the playing field, making cost-effective space or weapons employment an instant reality.

Of further note, accompanying this invention is the unprecedented ease of incremental or full upgrades of internal components which paves the way for extreme employment and modification cost reductions on a global scale, with no other federated system even coming close to the capabilities made instantly possible with this invention.

Additionally, the following expansion on the above is of notable importance:
- It provides the entire spectrum of what is needed to achieve an instant alternative to the legacy ground-based infrastructure, while allowing for a confidence building transition whereby the legacy systems can operate until such time that full confidence is gained in with the operation of this system.
- It provides a sequential test case opportunity whereby a methodical method of testing can occur between two weapons to demonstrate collaborative aspects, and then add a third, fourth etc. as confidence is demonstrated with operational proof.
- It can be tested at traditional ground based instrumentation ranges, and simultaneously be tested in a remote location where more aggressive missions can be conducted without risk to life or property.
- It allows for unlimited simulations to be conducted with all conceivable scenarios until confidence is gained for initial testing with real hardware in a real scenario.
- It enables numerous weather assets not necessarily available on a traditional launch range to be integrated into the system, and subsequently employed once confidence is gained in their data.
- It leverages the most state-of-the-art power high energy and safe battery power systems available in the world today, drastically shrinking critical unit size and launch weight when compared to traditionally employed power systems aboard missiles, rockets and payloads.
- It makes possible a whole new era of weapons effectively by enabling 'on the fly' rapid retargeting to occur as the weapons communicate amongst each other their real-time state of engagement of targets.
- It has a solid heritage of passing all worst-case space qualification testing with its open and modular design, thus severely reducing the development and time to field the system for rapid benefits to occur for leveling the financial and operational playing field, and also to quickly bring a much needed capability to our military.
- It is deployed in a similar hardware configuration regardless of application, with the only changes being a software load that is required for that particular mission.
- It is easily incorporated on any platform with a minimum of mounting required, providing a revolutionary capability with a very small size, weight and power footprint.
- It forms a flexible network for any launch or flight scenario, with each asset essentially being an IP address that is dynamically interconnected with all other IP addresses emanating from all other assets in the theatre of operation.

The many detailed descriptions above must not be interpreted in any manner to indicate a limit to the scope of this invention, as its only intent is to provide examples of its functionality obtained by employing it in many possible configurations. For example, the Vehicle Based Independent Range System may be employed in multiple locations aboard a single aircraft, UAV, rocket or missile depending upon mission requirements, and hence allow for compartmented operations to occur amongst assets. It is noted however, that no matter how many multiple locations of units are employed, the operational methods and capabilities remain essentially the same. The flexibility also exists for the system to accommodate more and diverse modules of different capabilities to be added to the baseline suite of 4 modules. If for instance, a customer desired to have the module stack include a secondary payload or some special sensor/capability to accompany the primary mission, it is instantly accommodated via the design of the defined modular stack by using exact and compatible hardware within each module comprising the stack.

Additionally, it must be noted that although this patent makes numerous references to Ka/Ku band as a preferred large bandwidth asset to be utilized by VBIRS for most if not all communication, VBIRS is actually agnostic to the satellite service it subscribes to, as selection of this service is dictated by the needs of the customer. Whichever LEO/MEO/GEO satellite service a customer requires, VBIRS open architecture will accommodate any modem to provide that particular service.

Finally, it is noted that this invention is quickly mass-producible and repeatable, however it is fully capable of accommodating any special design that may require a stretching or shrinking of dimensions in order to fulfill a special requirement while maintaining its capability to provide RFI/EMI shielding on a modular or sub-modular level, as well as an integrated box system level, while easily passing all required environmental full-scale qualification testing, including shock, vibration, thermal and the like. Thus, the scope of this invention should only be determined by the appended claims and their legal equivalents.

We claim:

1. A Vehicle Based Independent Range System (VBIRS) operating completely independent of ground based tracking, telemetry and command transmit range assets is comprised of the following individually stacked faraday cage modules systems collectively forming a single integrated deployable system for aircraft, missiles, rockets, unmanned aerial vehicles and any other desired vehicle to provide a self-contained space based range capability:
  i. a power module system comprised of a charging access means a battery and a dc-dc
     converter means with an electromagnetic interference filter means, providing power in proportions as required to the following modules,
  ii. an artificial intelligence and autonomous engagement flight termination
     module system comprised of an autonomous engagement controller means containing all destruct and engagement decision making software and range safety algorithm parameters required to make destruct or weapon engagement decisions, communicating with a vehicle propulsion controller means, a vehicle component separation system means, an ordnance means and vehicle destruct system means,
  iii. a satellite data module system comprised of a satellite data modem means, a satellite uplink controller means and a satellite downlink controller means,
  iv. a navigation, communications and control module system comprised of a radiation tolerant data processing system means, a communications system means, an inertial navigation system, a global positioning system antenna system, a global positioning system antenna combiner, and a global positioning system receiver, said navigation, communications and control module system interfaces with a VBIRS test and checkout system means and a weather data system means,
  said artificial intelligence and autonomous engagement flight termination module system
  comprised of an inherent artificial intelligence means that envelopes and
interchanges data with an autonomous engagement controller means, containing all vehicle
engagement and destruct decision software and range safety algorithm parameters required for mission planning to make autonomous destruct and weapon engagement decisions for any vehicle at any juncture from checkout
through flight,
  said artificial intelligence and autonomous engagement flight termination
  module system interfaces to said vehicle propulsion controller means to selectively control and also terminate vehicle thrust, said vehicle ordnance and destruct subsystem means to autonomously destroy any vehicle if it becomes a hazard, and said vehicle component separation system means that separates vehicle stages and components as dictated by mission requirements,
  said artificial intelligence and autonomous engagement flight termination module system engages with said radiation tolerant central processing means, and a communications system means at the heart of said navigation, communications and control module system, said radiation tolerant data processing means and communications system means receives direct input from a GPS receiver and an inertial navigation system that ingests GPS data via a GPS antenna system and a GPS antenna signal combiner, said radiation tolerant data processing system means and said communications system means directly interfaces with said satellite data modem means, communicating with any required communication satellite via said satellite uplink antenna controller means and said satellite downlink antenna controller means providing control of the antenna system communicating with satellites, whereby said satellite data modem means solves all complex Doppler Shift dynamics that naturally occur at high vehicle velocities and accelerations, in order to provide a sufficient communications link capability to meet any mission requirements,
  said navigation, communications and control module system simultaneously communicates with said satellite data module system and said artificial intelligence and autonomous engagement flight termination module system enabling a
  salvo launch capability in any sequence amongst any flight vehicles to occur autonomously within a
  collaborative environment whereby all flight vehicles communicate with each other via a satellite
  cross-link communication path from pre-launch through mission completion enabling optimized autonomous vehicle on target allocations to be prioritized amongst all vehicles, while giving the option to engage with human intervention, whereby said VBIRS enables a collaborative weapon and salvo launch capability in any sequence, while simultaneously operating completely independent of ground based tracking, telemetry and command transmit range assets.

2. A Vehicle Based Independent Range System (VBIRS) of claim 1 whereby said
  VBIRS is operationally installed aboard an aircraft launching system that launches a vehicle
  from any location on earth with the pilot locally in control of that vehicle launch, in addition to that functional launch capability being accomplished from anywhere else on earth whether the vehicle is singularly launched alone versus being part of a larger group of vehicles being launched within any theatre in any sequential arrangement, all in
  tactical communication with each other via said VBIRS aboard all aircraft launching systems and all vehicles undergoing launch with all vehicles and aircraft launching systems employing an arrangement of collaborative engagement algorithms means resident within said artificial intelligence and autonomous engagement flight termination module system in order to communicate tactical data between the aircraft launching system and the vehicles being launched.

3. A Vehicle Based Independent Range System (VBIRS) of claim 2 whereby said
  VBIRS is operationally and simultaneously employed on any combination of said air launch platforms and any number of ground launch vehicle launch sites.

4. A Vehicle Based Independent Range System (VBIRS) of claim 3 whereby a VBIRS
  equipped UAV launch platform operates within the same defined theatre that simultaneously communicates with said orbiting satellite cross-link communication path to participate in said salvo arrangement as part of the same mission.

\* \* \* \* \*